(12) United States Patent
Tsuchida et al.

(10) Patent No.: US 6,577,228 B1
(45) Date of Patent: Jun. 10, 2003

(54) DOOR HANDLE FOR VEHICLE AND SMART ENTRY SYSTEM FOR VEHICLE USING THE SAME

(75) Inventors: Tamotsu Tsuchida, Toyota (JP); Keiji Yamamoto, Toyota (JP); Hiroki Okada, Toyota (JP); Yuichi Murakami, Chiryu (JP); Morihito Nomura, Toyoake (JP)

(73) Assignees: Toyota Jidosha Kabushiki Kaisha, Toyota (JP); Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/372,205

(22) Filed: Aug. 11, 1999

(30) Foreign Application Priority Data

Dec. 2, 1998 (JP) ............................ 10-343296

(51) Int. Cl.[7] .................................. G06F 7/04
(52) U.S. Cl. .................. 340/5.72; 340/10.1; 340/10.33; 340/825.69; 340/825.72; 343/767
(58) Field of Search ............... 340/5.72, 10.1, 340/10.33, 5.61, 825.69, 825.72; 343/767, 702, 711, 712, 713, 718

(56) References Cited

U.S. PATENT DOCUMENTS

| | | | | |
|---|---|---|---|---|
| 4,760,394 A | * | 7/1988 | Takeuchi et al. | 340/825.54 |
| 5,844,470 A | * | 12/1998 | Garnault et al. | 340/426 |
| 6,304,168 B1 | * | 10/2001 | Ohta et al. | 340/5.72 |

FOREIGN PATENT DOCUMENTS

| | | |
|---|---|---|
| JP | 59-44861 U | 3/1984 |
| JP | A-60-138190 | 7/1985 |
| JP | A-1-269392 | 10/1989 |
| JP | A-5-156851 | 6/1993 |

* cited by examiner

*Primary Examiner*—Michael Horabik
*Assistant Examiner*—M Shimizu
(74) *Attorney, Agent, or Firm*—Oliff & Berridge, PLC

(57) ABSTRACT

A door handle for a vehicle which can miniaturize a transmitter provided on the vehicle and reduce a cost of the system is provided. The door handle includes a handle body which is mounted on an outer face of a door of the vehicle. A least a transmitting antenna of a transmitter which transmits a radio signal toward outside of the vehicle is integrated with the handle body. A smart key entry system for a vehicle using the door handle is also provided.

11 Claims, 9 Drawing Sheets

DOOR HANDLE FOR VEHICLE AND SMART ENTRY SYSTEM FOR VEHICLE USING THE SAME

BACKGROUND OF THE INVENTION

1. Field of the Invention

The present invention relates to a door handle for a vehicle, and in particular to a door handle suited to be used in a vehicle which includes a transmitter for transmitting a radio signal. The present invention also relates to a smart entry system for a vehicle using the door handle.

2. Description of the Related Art

Conventionally, there is known an electronic key system which remote-controls lock/unlock of a door of a vehicle. For example, an electronic key system disclosed in Japanese Laid-Open Patent Application No. 5-156851 includes a wristwatch provided with a transmitter for generating ultrasonic waves modulated with a code for opening/closing operations of a door of a vehicle. A receiver is provided inside a door panel near the door handle for receiving the ultrasonic waves. The code for the opening/closing operations is demodulated from the received ultrasonic waves, and a key actuator is actuated in accordance with the demodulated code.

Recently, developments have been made of what is called a smart entry system in which a door of a vehicle is unlocked or locked when a user carrying a radio device comes close to or moves away from the vehicle. Such a smart entry system includes an onboard station which is provided on a vehicle and a portable station which is carried by a user. The onboard station transmits a radio request signal, and the portable station transmits a radio response signal including a predetermined code in response to the radio request signal transmitted by the onboard station. When the onboard station receives the radio response signal transmitted by the portable station, the onboard station compares the code included in the received response signal with a specific code. If the received code corresponds to the specific code, the onboard station unlocks the door. Thereafter, when the onboard station no longer receives the radio response signal from the portable station, the door is locked.

In such a smart entry system, if a transmitting antenna of the onboard station is provided inside a metallic door panel as in a case of the above-mentioned conventional electronic key system, an area in which the transmitted signal can reach (hereinafter referred to as a transmission area Ai) becomes narrower as shown in FIG. 1 for a higher frequency of the transmitted signal since the transmitted signal is shaded by the door panel to a greater extent. Thus, in order to enlarge the transmission area Ai, it is necessary to use a low frequency or large output power for the radio signal to be transmitted. In this case, a scale of a transmission circuit becomes larger and a cost of the system increases.

SUMMARY OF THE INVENTION

It is a first object of the present invention to provide a door handle for a vehicle which can miniaturize a transmitter provided on the vehicle and reduce a cost of the system.

It is a second object of the present invention to provide a smart entry system for a vehicle which can miniaturize a transmitter of an onboard station and reduce a cost of the system.

The first object of the present invention can be achieved by a door handle for a vehicle, the door handle comprising:

a handle body which is mounted on an outer face of a door of the vehicle; and at least a transmitting antenna of a transmitter which transmits a radio signal toward outside of the vehicle, the at least a transmitting antenna being integrated with the handle body.

The second object of the present invention can be achieved by a smart entry system for a vehicle which includes an onboard station and a portable station, wherein the onboard station comprises:

a transmitter for transmitting a radio request signal via a transmitting antenna, at least the transmitting antenna being integrated with a door handle of the vehicle which is mounted on an outer face of a door of the vehicle; and a receiver for receiving a radio response signal via a receiving antenna transmitted from the portable station in response to the radio request signal.

According to the inventions, since the radio signal is transmitted from the transmitting antenna which is integrated with the door handle mounted on an outer face of the door, the transmitted radio signal is not shaded by an outer door panel of the door. Accordingly, the radio signal can be transmitted from the antenna with a high efficiency without usage of a high frequency or a large output power. Thus, it is possible to miniaturize the transmitter and reduce a cost of the system while achieving a wide transmission area.

Other objects and further features of the present invention will be apparent from the following detailed description when read in conjunction with the accompanying drawings.

DESCRIPTION OF THE PREFERRED EMBODIMENTS

Figure 1:
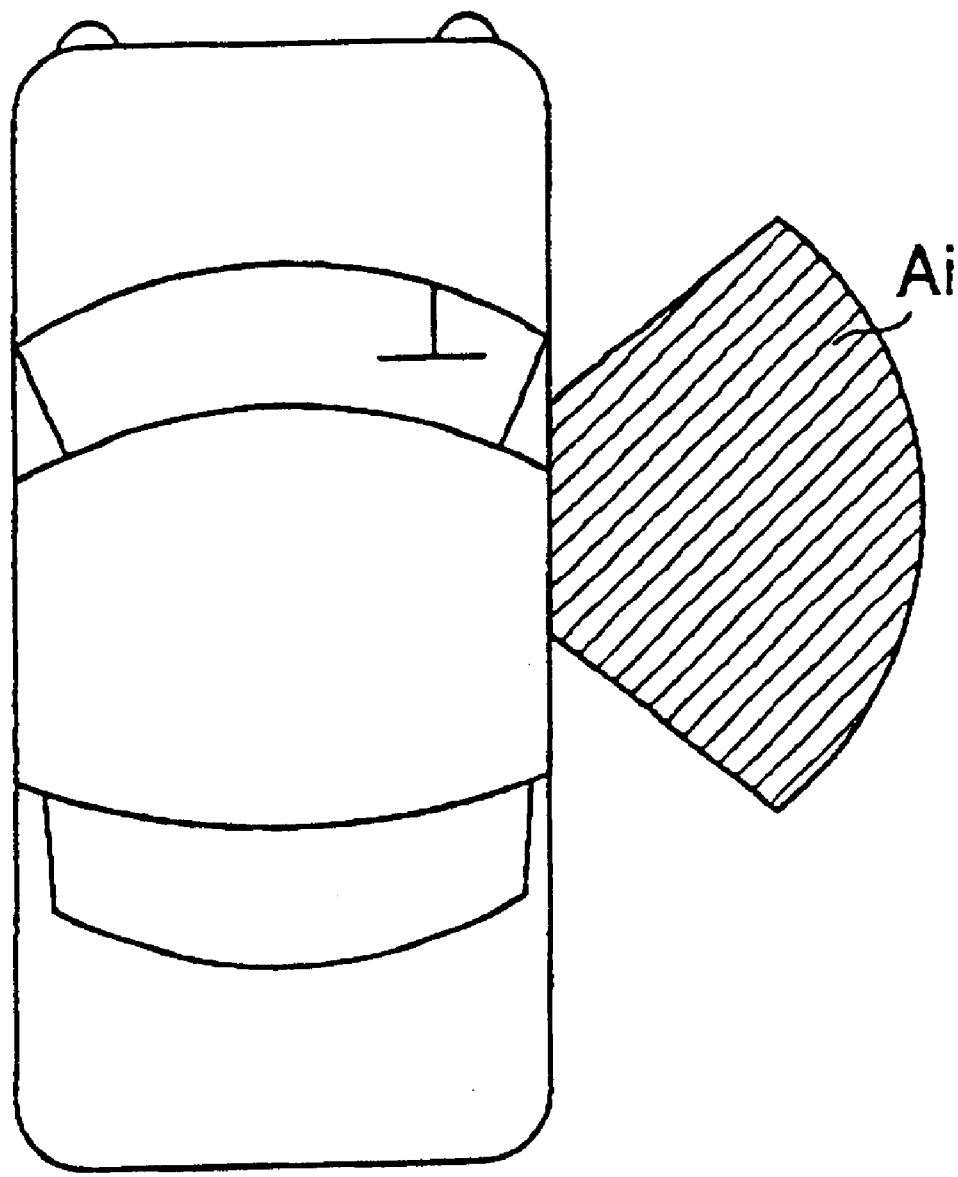
FIG. 1 is a diagram showing a transmission area achieved by a conventional art.
Figure 2:
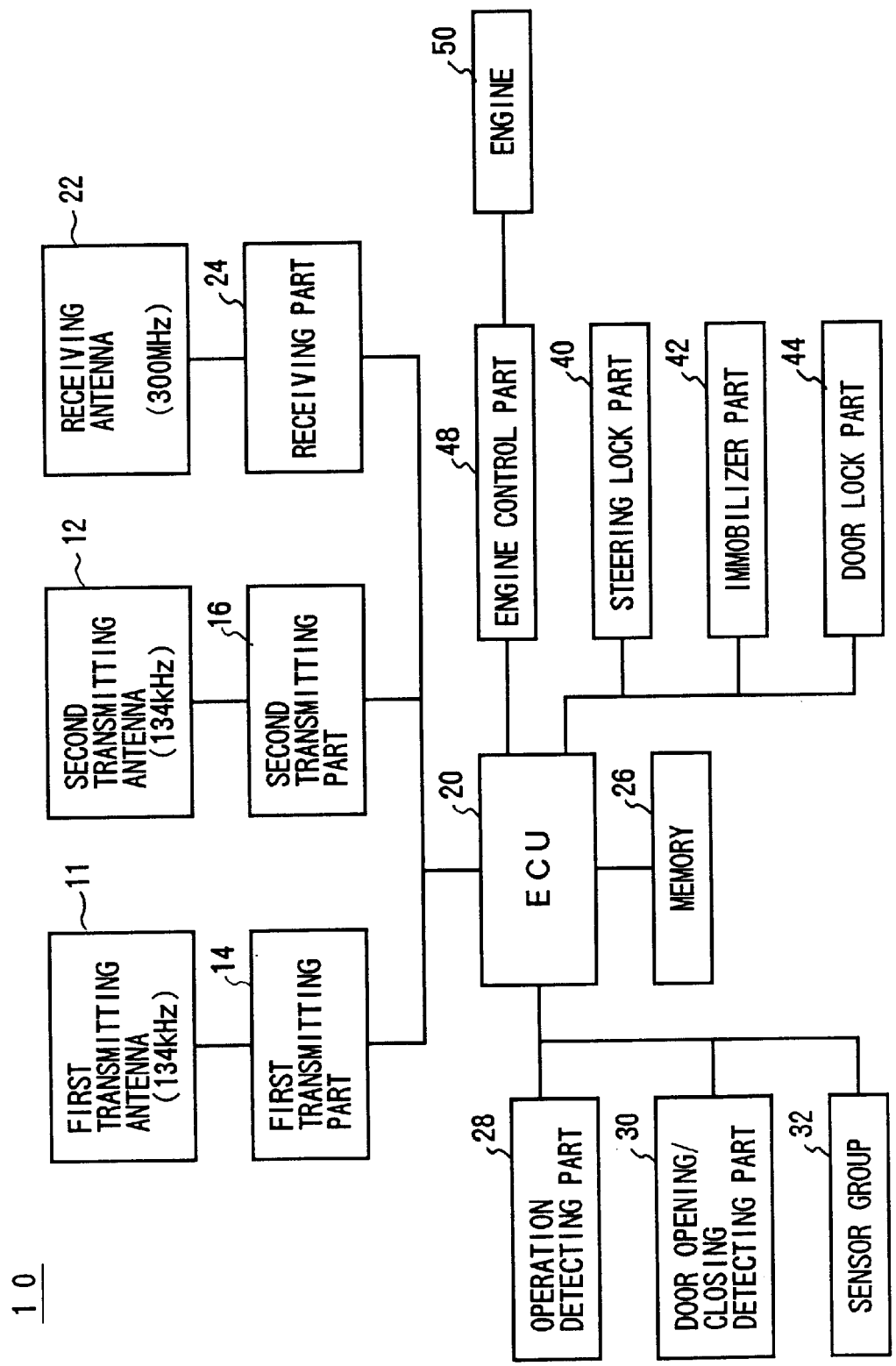
FIG. 2 is a block diagram showing an onboard station of an example of a smart entry system in which a door handle according to the present invention is applied.

FIG. 2 is a block diagram showing an onboard station 10 of an example of a smart entry system in which a door handle according to the present invention is applied. As shown in FIG. 2, the onboard station 10 includes a first transmitting antenna 11 and a second transmitting antenna 12. The first transmitting antenna 11 is provided inside a door handle of a door of a vehicle. On the other hand, the second transmitting antenna 12 is provided near an instrument panel inside a cabin of the vehicle. The first transmitting antenna 11 is connected to a first transmitting part 14, and the second transmitting antenna 12 is connected to a second transmitting part 16. The first transmitting part 14 and the second transmitting part 16 are connected to an ECU (electronic control unit) 20.

The ECU 20 supplies first and second request codes to the first transmitting part 14 and the second transmitting part 16, respectively. The first transmitting part 14 and the second transmitting part 16 modulate radio signals having a frequency f1 (134 kHz, for example) with the first and second request codes, respectively. The modulated request signals are transmitted from the first transmitting antenna 11 and the second transmitting antenna 12, respectively, toward a portable station 60 which will be described below. It should be noted that the first transmitting part 14 and the second transmitting part 16 may be integrally constructed as a single circuit.

A receiving antenna 22 is provided inside an inner mirror of the vehicle for receiving a signal having a frequency f2 (300 MHz, for example) transmitted by the portable station 60. The signal received by the receiving antenna 22 is demodulated in a receiving part 24 and then supplied to the ECU 20.

A memory 26 is connected to the ECU 20. The memory 20 contains a plurality of different codes stored therein such as a first code for locking the door, a second code for starting an engine and a transponder ID code. The memory 26 is a non-volatile memory such as an EEPROM. Thus, contents stored in the memory 26 are maintained if power supply to the memory 26 is shut off.

An operation detecting part 28 detects operations of various switches by a user. For example, when the operation detecting part 28 detects an operation of an ignition switch, the operation detecting part 28 supplies a detection signal indicating the operation of the ignition switch to the ECU 20. A door opening/closing detecting part 30 detects opening/closing of a door on a side of a driver seat (or each door of the vehicle) and supplies a detection signal to the ECU 20. A sensor group 32 includes various sensors for detecting a vehicle speed and opening/closing of a window. These sensors supply detection signals to the ECU 20.

Additionally, a steering lock part 40, an immobilizer part 42 and a door lock part 44 are connected to the ECU 20. The steering lock part 40 mechanically prohibits a steering operation. The immobilizer part 42 prohibits fuel supply and ignition of an engine 50. The door lock part 44 locks and unlocks each door of the vehicle.

Further, an engine control part 48 is connected to the ECU 20. The engine control part 48 controls a start operation of the engine 50 by means of a cell motor, as well as a regular operation of the engine 50.

Figure 3:
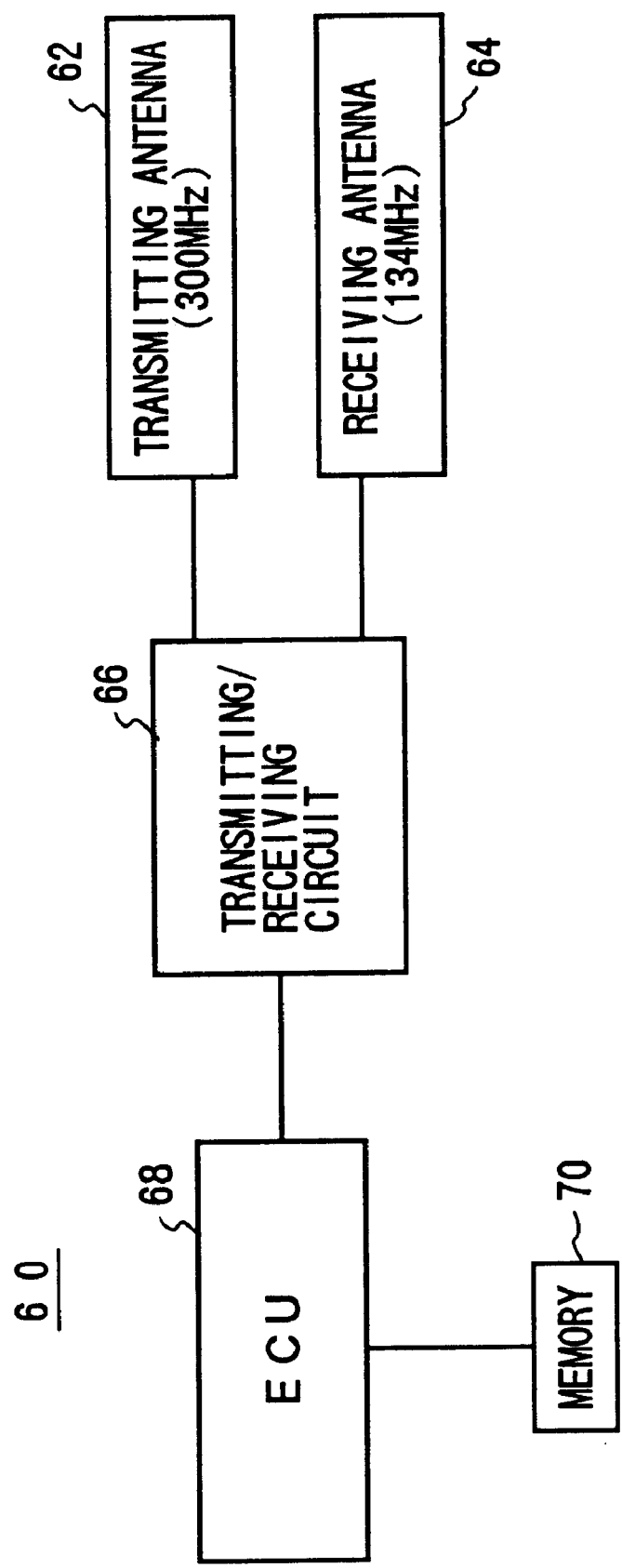
FIG. 3 is a block diagram showing a portable station of the smart entry system.

FIG. 3 is a block diagram showing the portable station 60 of the smart entry system. As shown in FIG. 3, the portable station 60 includes a transmitting antenna 62 and a receiving antenna 64. These antennas 62, 64 are connected to a transmitting/receiving circuit 66. The transmitting/receiving circuit 66 is connected to an ECU 68. When the receiving antenna 64 receives the request signal having the frequency f1 transmitted by the onboard station 10, the received signal is demodulated in the transmitting/receiving circuit 66 and then supplied to the ECU 68.

A memory 70 is connected to the ECU 68. The memory 70 contains first and second codes stored therein. The first and second codes are read out from the memory 70 and supplied to the transmitting/receiving circuit 66 by the ECU 68. These first and second codes are modulated in the transmitting/receiving circuit 66 and transmitted as a radio signal having the frequency f2 (300 MHz, for example) from the transmitting antenna 62 toward the onboard station 10.

Figure 4:
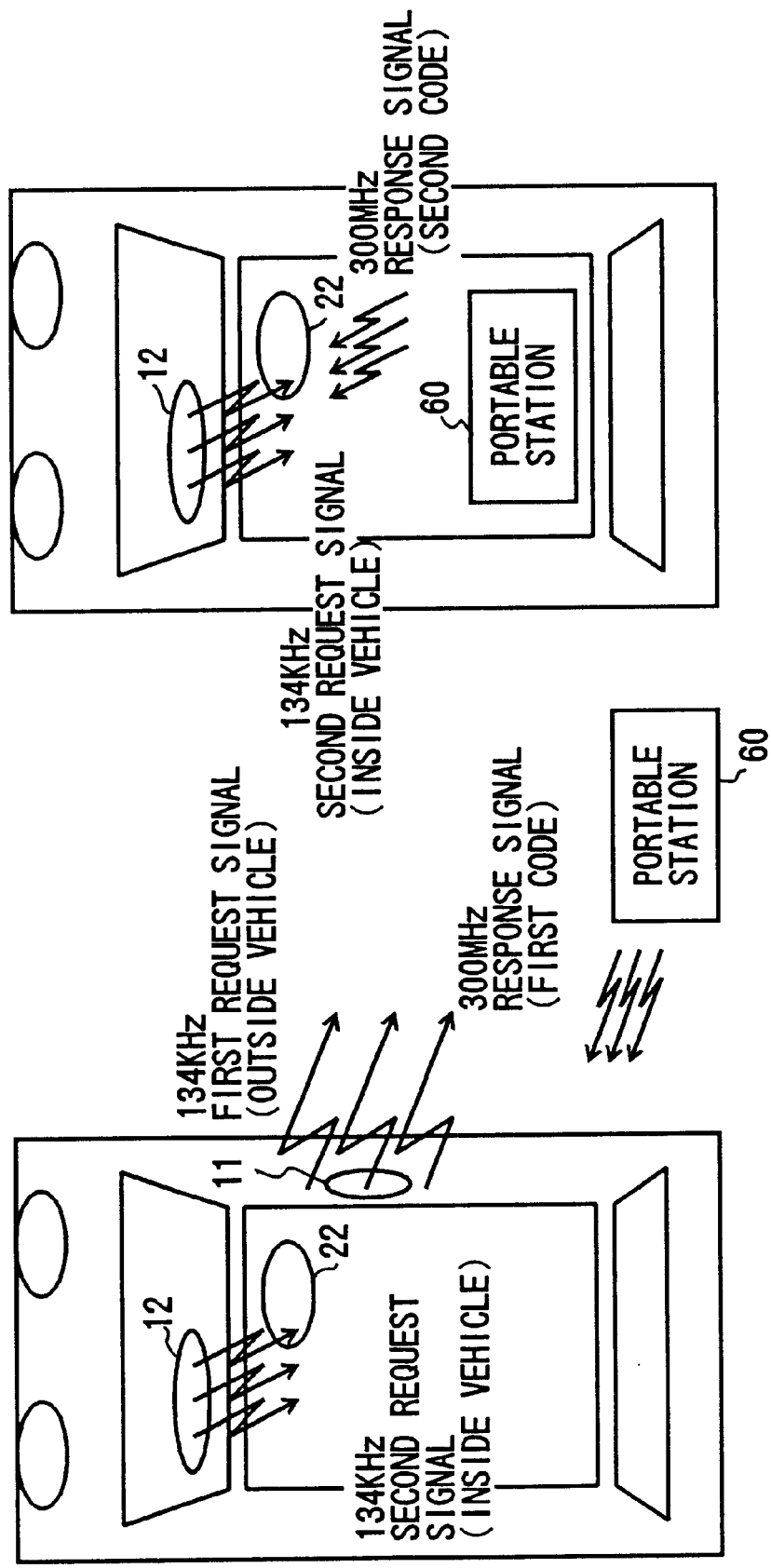
FIG. 4 is a diagram schematically showing a communication between the onboard station and the portable station.

FIG. 4 schematically shows an example of a communication between the onboard station 10 and the portable station 60. As shown in FIG. 4, the first and second request signals having the frequency f1 are transmitted from the first and second transmitting antennas 11, 12 of the onboard station 10, respectively. When the portable station 60 receives the first request signal (when the portable station 60 is outside the vehicle) or the second request signal (when the portable station 60 is inside the vehicle), the portable station 60 transmits a signal having the frequency f2 which is modulated with the first or second code in accordance with the received request signal. When the signal transmitted by the portable station 60 is received by the receiving antenna 22 provided inside the inner mirror, the received signal is demodulated in the receiving circuit 24 and then supplied to the ECU 20. Thus, the ECU 20 can detect the first or second code transmitted by the portable station 60.

Figure 5:
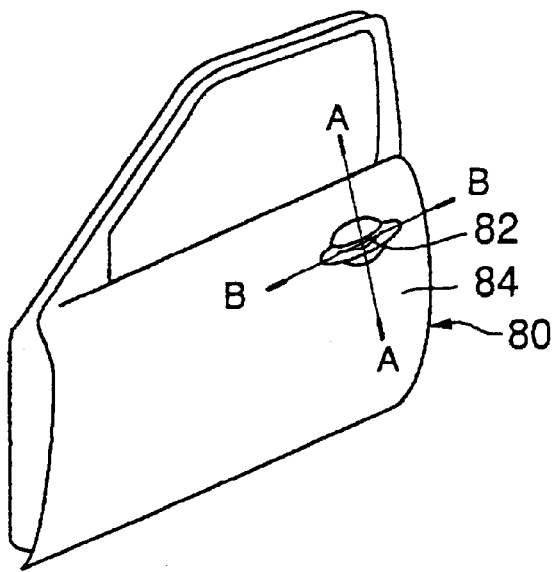
FIG. 5 is a diagram showing a perspective view of a door of a vehicle.

FIG. 5 shows a perspective view of a door 80 of the vehicle. As shown in FIG. 5, a door handle 82 of a grip type according to the present invention is mounted to a metallic outer door panel 84 of the door 80 so that the door handle 82 projects outwardly in a lateral direction of the vehicle. The door handle 82 has a shape of a bent pipe and is fixed to the outer door panel 84 at both ends thereof. Thus, the door 80 can be opened and closed by gripping a grip part in the intermediate part of the door handle 82 by a human hand.

Figure 6:
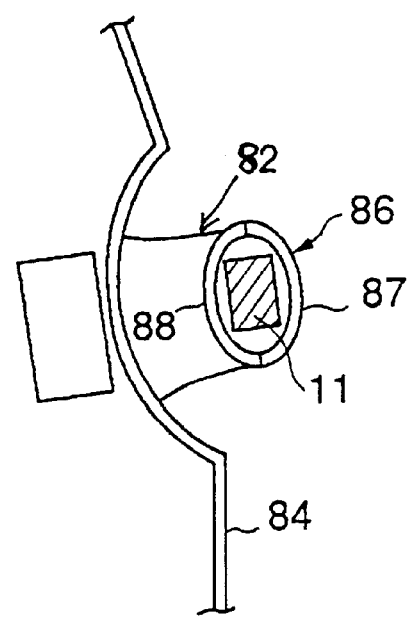
FIG. 6 is a diagram showing a cross section of the door handle along a line A—A.
Figure 7:
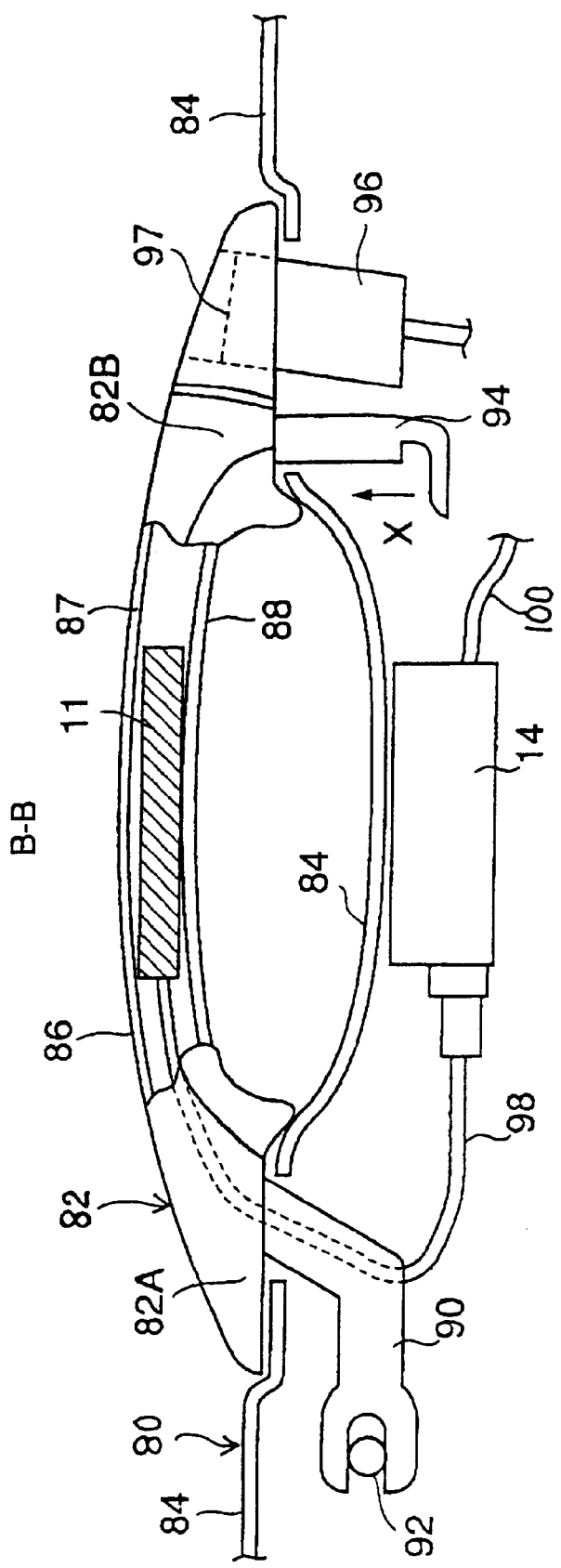
FIG. 7 is a diagram showing a cross section of the door handle along a line B—B.

FIGS. 6 and 7 show cross sections of the door handle 82 along a line A—A and a line B—B, respectively. As shown in FIG. 6, a handle grip part 86 of the door handle 82 has a hollow structure constituted by a combination of a plastic handle case 87 which is provided on an outer side of the vehicle and a plastic or metallic handle case 88 which is provided on an inner side of the vehicle. The first transmitting antenna 11 is disposed inside the handle grip part 86.

As shown in FIG. 7, an arm 90 extends from one end 82A of the door handle 82. The arm 90 is inserted into the door 80 through the outer door panel 84. A tip of the arm 90 is pivotably connected to a pivot shaft 92. On the other side, a lever 94 extends from the other end 82B of the door handle 82. The lever 94 is inserted into the door 80 through the outer door panel 84. A tip of the lever 94 is connected to a door opening/closing mechanism which is not shown in the figures.

When the handle grip part 86 is gripped by a human hand and pulled outwardly in a lateral direction of the vehicle, the lever 94 pivots around the pivot axis 92 in a direction indicated by an arrow X. Thus, the door 80 is opened by the door opening/closing mechanism being actuated. A door key cylinder 96 is mounted to the door 80 near the lever 94 by being inserted into the door handle 82 through the outer door panel 84 so that a keyhole face thereof is exposed outside.

As shown FIGS. 6 and 7, the first transmitting antenna 11 is disposed inside the handle grip part 86, and the first transmitting part 14 (including a current detecting circuit 122 which will be described below) is mounted on an inner side of the outer door panel 84. The first transmitting antenna 11 and the first transmitting part 14 are connected by a wire harness 98 which extends inside the door handle 82 and the arm 90. Additionally, the first transmitting part 14 is connected to the ECU 20 by a wire harness 100.

Figure 8:
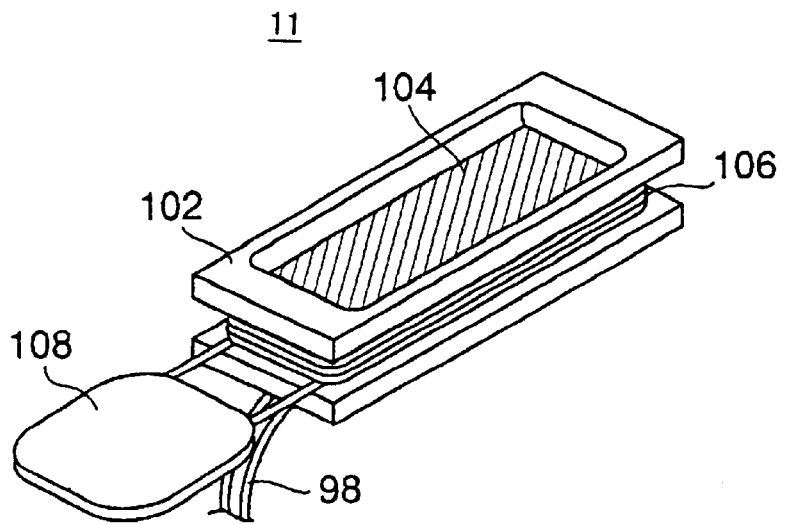
FIG. 8 is a diagram showing a perspective view of a first transmitting antenna.

FIG. 8 shows a perspective view of the first transmitting antenna 11. As shown in FIG. 8, a case 102 which is made of resin has an elongated plate-like shape with a center part thereof being cut oit. A ferrite plate 104 is supported in the cut-out part of the case 102. A coil 106 is wound around a peripheral edge of the case 102. The coil 106 is connected to a condenser 108 and the wire harness 98 to constitute the transmitting antenna 11. The condenser 108 is disposed adjacently to the case 102 in a longitudinal direction of the case 102. It should be noted that the case 102 may be made of ferrite. In this case, it is not necessary to cut out the center part of the case 102.

Figure 9:
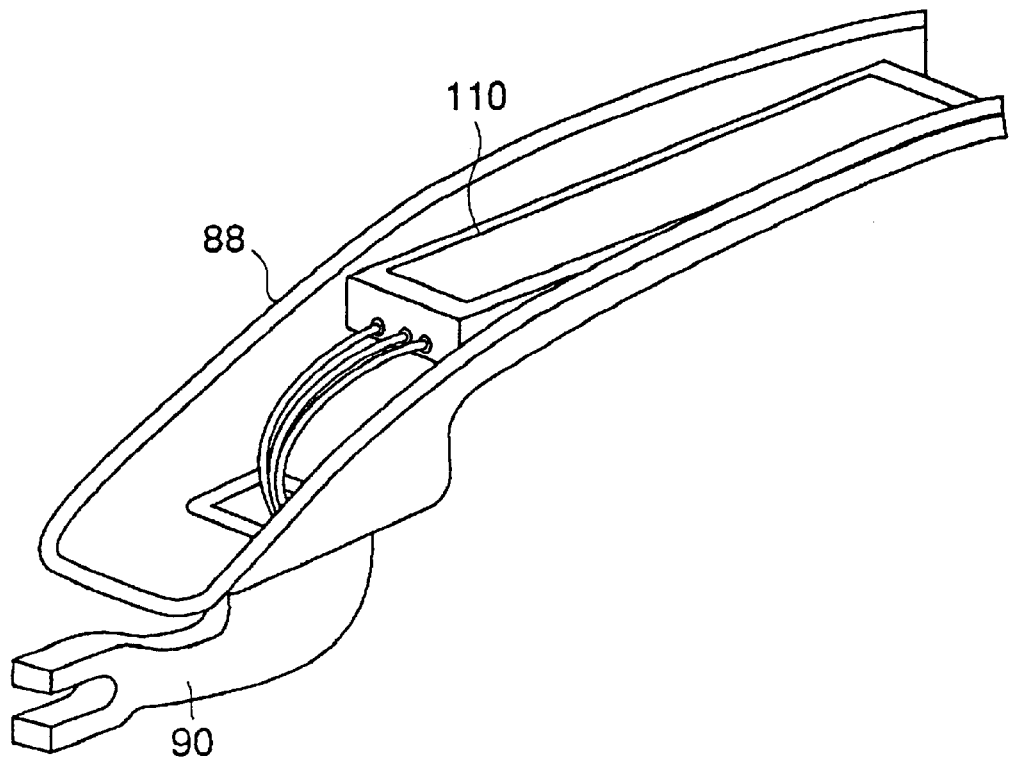
FIG. 9 is a diagram showing a perspective view of a handle case of the door handle.

In an assembling process of the door handle 82, the first transmitting antenna 11 is fitted and fixed in an antenna containing part 110 provided inside the metallic handle case 88 shown in FIG. 9. Then, the antenna containing part 110 is filled with a waterproofing material (silicone, for example). Thereafter, the plastic handle case 87 is mounted to the handle case 88 to form the handle 82.

Figure 10:
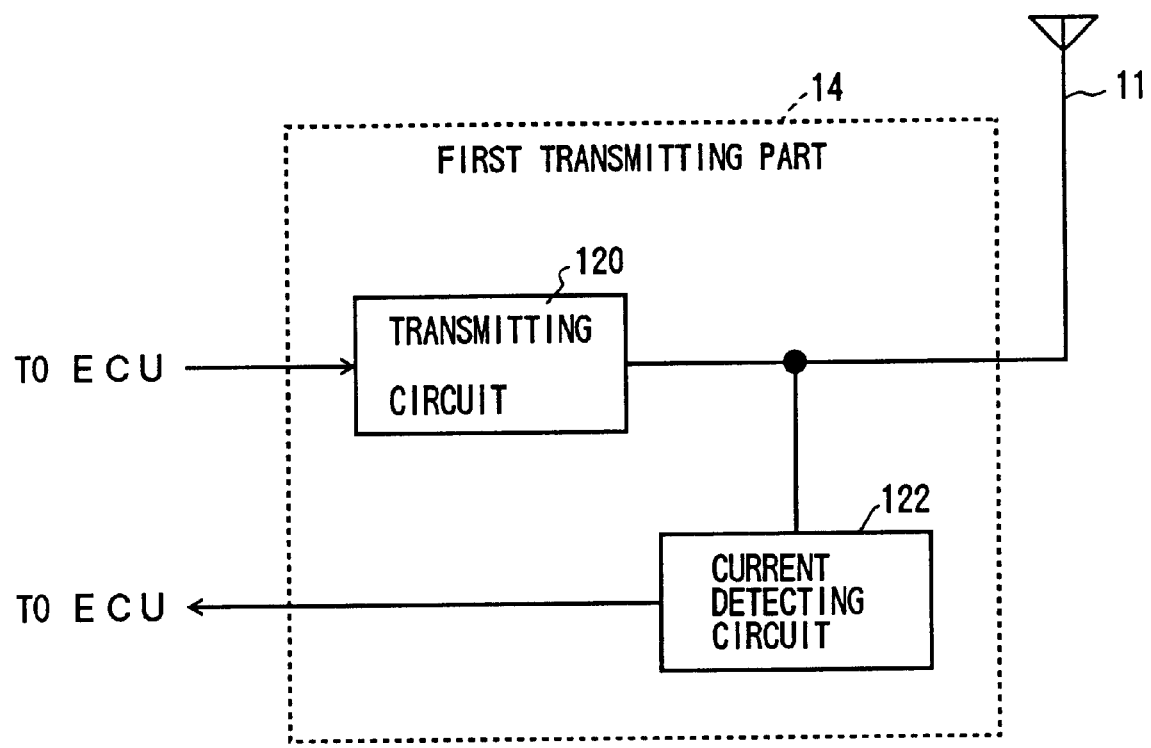
FIG. 10 is a block diagram showing a first transmitting part.

As shown in FIG. 10, the first transmitting part 14 is provided with the current detecting circuit 122 in addition to a transmitting circuit 120. The current detecting circuit 122 detects a current flowing though the first transmitting antenna 11. When a human hand touches the handle grip part 86 to open the door 80, a stray capacitance of the first transmitting antenna 11 increases so that a current flowing through the first transmitting antenna 11 momentarily changes. The current detecting circuit 122 detects a contact of a human hand to the handle grip part 86 by detecting the above-mentioned current change and supplies a detection signal to the ECU 20.

Figure 11:
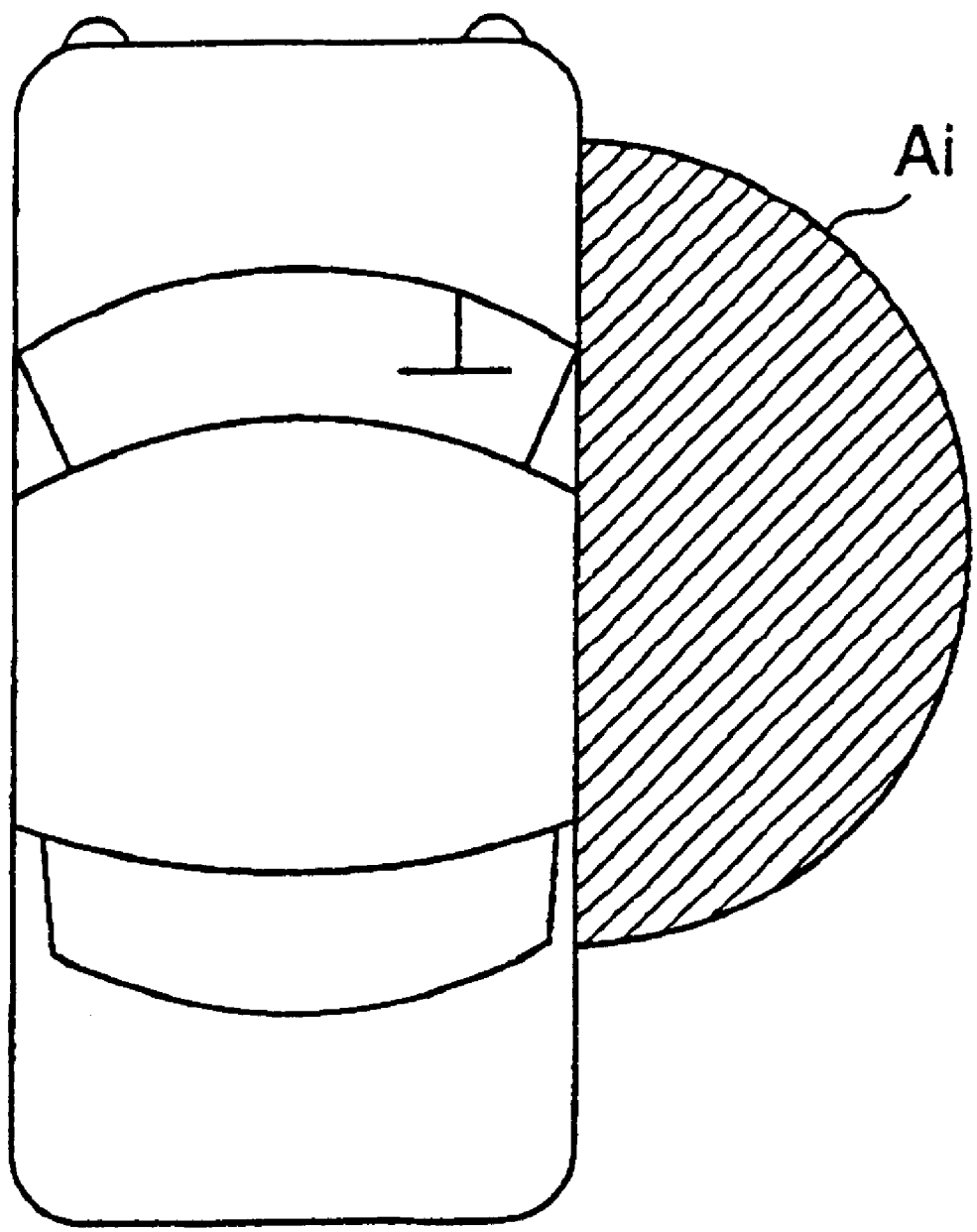
FIG. 11 is a diagram showing a transmission area achieved by the present invention.

As mentioned above, the first transmitting antenna 11, which is a part of a transmitter, is disposed inside the door handle 82 which outwardly projects from the door 80 so that the transmitting antenna 11 is positioned outside the door 80. Since the request signal can be transmitted from the first transmitting antenna 10 through the plastic handle case 87, the request signal is not shaded by the door 80. Thus, it is possible to use a relatively high frequency and relatively small output power for the request signal while achieving a wide transmission area Ai as shown in FIG. 11. Additionally, the door handle 82 can be miniaturized since only the first transmitting antenna 11 is disposed inside the door handle 82.

In the above-mentioned embodiment, the receiving antenna 22 is disposed inside the inner mirror of the vehicle. However, the receiving antenna 22 may be disposed at any position where radio signals from outside the vehicle can be received. For example, the receiving antenna 22 may be provided at a center of the vehicle so as to be used as a common antenna for both sides of a driver seat and a passenger seat, or the receiving antenna 22 may be separately provided to each side of a driver seat and a passenger seat inside the door handle or the door.

The present invention is not limited to these embodiments, but variations and modifications may be made without departing from the scope of the present invention.

The present application is based on Japanese priority application No. 10-343296 filed on Dec. 2, 1998, the entire contents of which are hereby incorporated by reference.

What is claimed is:

1. A door handle for a vehicle, the door handle comprising:
    a gripping part which is mounted on an outer face of a door of the vehicle; and
    at least a transmitting antenna of a transmitter which transmits a radio signal toward outside of the vehicle, said at least a transmitting antenna being integrated with said gripping part, wherein said gripping part comprises:
        a first part which is made of electrically insulating material; and
        a second part which is fixed to said first part so that a hollow space is formed between said first and second parts, wherein said at least a transmitting antenna is disposed in said hollow space.

2. A door handle for a vehicle, the door handle comprising:
    a gripping part which is mounted on an outer face of a door of the vehicle;
    at least a transmitting antenna of a transmitter which transmits a radio signal toward outside of the vehicle, said at least a transmitting antenna being integrated with said gripping part; and
    a contact detector which detects a contact of a human hand to said door handle based on a current flowing through said at least a transmitting antenna.

3. The door handle for a vehicle as claimed in claim 1, wherein said transmitter constitutes a part of an onboard station of a smart entry system.

4. The door handle for a vehicle as claimed in claim 3, wherein said radio signal is a request signal to received by a portable station of the smart entry system.

5. The door handle for a vehicle as claimed in claim 1, wherein said transmitting antenna comprises:
    a coil which is wound around a magnetic core; and
    a condenser which is connected to said coil.

6. The door handle for a vehicle as claimed in claim 5, wherein said magnetic core has an elongated shape and said condenser is disposed adjacently to said coil in a longitudinal direction of said magnetic core.

7. A smart entry system for a vehicle which includes an onboard station and a portable station, wherein said onboard station comprises:
    a transmitter for transmitting a radio request signal via a transmitting antenna, at least said transmitting antenna being integrated with a gripping part of a door handle of the vehicle which is mounted on an outer face of a door of the vehicle; and
    a receiver for receiving a radio response signal via a receiving antenna transmitted from said portable station in response to said radio request signal wherein said gripping part comprises:
        a first part which is made of electrically insulating material; and
        a second part which is fixed to said first part so that a hollow space is formed between said first and second parts, wherein said at least said transmitting antenna is provided in said hollow space.

8. A smart entry system for a vehicle which includes an onboard station and a portable station, wherein said onboard station comprises:
    a transmitter for transmitting a radio request signal via a transmitting antenna, at least said transmitting antenna being integrated with a gripping part of a door handle of the vehicle which is mounted on an outer face of a door of the vehicle;
    a receiver for receiving a radio receiver signal via a receiving antenna transmitted from said portable station in response to said radio request signal; and
    a contact detector which detects a contact of a human hand to said door handle based on a current flowing through said transmitting antenna.

9. The smart entry system for a vehicle as claimed in claim 7, wherein said receiving antenna is disposed inside an inner mirror of the vehicle.

10. A door handle for a vehicle, the door handle comprising:
- a handle body which is mounted on an outer face of a door of the vehicle;
- at least a transmitting antenna of a transmitter which transmits a radio signal toward outside of the vehicle, said at least a transmitting antenna being integrated with said handle body; and
- a contact detector which detects a contact of a human hand to said door handle based on a current flowing through said at least a transmitting antenna.

11. A smart entry system for a vehicle which includes an onboard station and a portable station, wherein said onboard station comprises:
- a transmitter for transmitting a radio request signal via a transmitting antenna, at least said transmitting antenna being integrated with a door handle of the vehicle which is mounted on an outer face of a door of the vehicle;
- a contact detector which detects a contact of a human hand to said door handle based on a current flowing through said transmitting antenna; and
- a receiver for receiving a radio response signal via a receiving antenna transmitted from said portable station in response to said radio request signal.

* * * * *